United States Patent
Wright

(10) Patent No.: US 9,604,620 B2
(45) Date of Patent: Mar. 28, 2017

(54) AIR DRYER SYSTEM FOR A LOCOMOTIVE WITH OPTIMIZED PURGE AIR CONTROL

(71) Applicant: NEW YORK AIR BRAKE, LLC, Watertown, NY (US)

(72) Inventor: Eric C. Wright, Evans Mills, NY (US)

(73) Assignee: NEW YORK AIR BRAKE, LLC, Watertown, NY (US)

( * ) Notice: Subject to any disclaimer, the term of this patent is extended or adjusted under 35 U.S.C. 154(b) by 0 days.

(21) Appl. No.: 15/268,856

(22) Filed: Sep. 19, 2016

(65) Prior Publication Data

US 2017/0001617 A1    Jan. 5, 2017

Related U.S. Application Data

(62) Division of application No. 14/559,465, filed on Dec. 3, 2014, now Pat. No. 9,469,287.

(51) Int. Cl.

| | |
|---|---|
| *B01D 53/02* | (2006.01) |
| *B60T 17/00* | (2006.01) |
| *B01D 53/26* | (2006.01) |
| *B01D 53/04* | (2006.01) |
| *B01D 53/047* | (2006.01) |
| *G05B 15/02* | (2006.01) |
| *G06F 17/18* | (2006.01) |
| *B61H 13/34* | (2006.01) |

(52) U.S. Cl.
CPC .......... *B60T 17/004* (2013.01); *B01D 53/047* (2013.01); *B01D 53/0454* (2013.01); *B01D 53/261* (2013.01); *B61H 13/34* (2013.01); *G05B 15/02* (2013.01); *G06F 17/18* (2013.01); *B01D 2257/80* (2013.01); *B01D 2259/4566* (2013.01)

(58) Field of Classification Search
CPC .............. B01D 53/261; B01D 53/0415; B01D 53/0454; B01D 53/268; B01D 2257/80; B01D 2259/4566; Y10S 55/17; B60T 17/004; B60T 17/006; F24F 2221/12; F24F 3/14
See application file for complete search history.

*Primary Examiner* — Christopher P Jones
(74) *Attorney, Agent, or Firm* — David L. Nocilly; Bond, Schoeneck & King, PLLC

(57) ABSTRACT

An air dryer system for a locomotive having optimized purge air control over a twin tower desiccant-type air dryer. The computer controlled locomotive brake system is used to determine when the air dryer is being used and approximately how much air flow has actually passed through the active tower of the dryer using the air consumption state, the change of pressure in the second main reservoir, the air compressor on/off state, the total accumulated time of air flow since last purge cycle, and/or the calculated air flow through the air dryer since the last purge cycle. When the actual air flow reaches the capacity of the active tower of the air dryer, the computer controlled locomotive brake system commands the air dryer to perform a purge cycle. The system thus maximizes the use of each tower in the air dryer rather than switching according to a preset time period.

6 Claims, 2 Drawing Sheets

AIR DRYER SYSTEM FOR A LOCOMOTIVE WITH OPTIMIZED PURGE AIR CONTROL

CROSS-REFERENCE TO A RELATED APPLICATION

This application is a divisional of U.S. application Ser. No. 14/559,465, filed Dec. 3, 2014.

BACKGROUND OF THE INVENTION

1. Field of the Invention

The present invention relates to locomotive air dryers and, more specifically, to an approach for optimizing purge cycling of an air dryer.

2. Description of the Related Art

Twin tower desiccant air dryers are used removing water vapor from compressed air in locomotive braking systems. In a twin tower system, one tower comprises a column of desiccant material and is used to absorb the water vapor in the inlet air stream by flowing wet air through the desiccant column. The desiccant absorbs the water vapor from the air stream so that the air discharged from the outlet of the air dryer is nominally dryer by an amount proportional to, among other variables, the amount of desiccant material in the column of the tower, the geometry of the column, and the air velocity in the column. Eventually, the first tower becomes saturated with water and is no longer effective in removing water from the inlet air stream.

When the active tower becomes saturated, the control system for the air dryer switches the inlet air stream to the other tower, which is nominally the same construction as the first tower, so that drying may continue. Concurrently, some of the dry air discharged from air dryer outlet is redirected through the first tower to atmosphere. This counter-flow of dry air removes the accumulated moisture from the desiccant column of the first tower and transports it to atmosphere. When the second tower eventually becomes saturated, the inlet air is switched back to the first tower and the second tower is purged, and the cycling between the two towers is repeated as needed. This counter-flow operation to remove moisture from a saturated column is referred to as a purge cycle and typically consumes 15-20% of the dry air discharged from the air dryer.

In an ideal locomotive air system having a constant air flow through the air dryer, the air dryer purge cycle and switching between the two desiccant columns can be done with a simple timer. In practice, however, the flow of air through the air dryer is never constant. For example, the air flow to the brake system can vary from very low flow rates needed to maintain the system against brake pipe leakage to very high air flows to recharge the train brake system after brake release. As a result, switching according to a fixed time schedule wastes energy and compressed air as a fixed-time purge cycle results in purge cycling before the desiccant in a particular column is fully saturated. While an air dryer system could include a flow meter or a humidity meter that more accurately determines when the purge cycle should be implemented, these technologies are expensive and often unreliable in the severe environment of a locomotive. Accordingly, there is a need for an inexpensive and reliable approach for determining when to perform the purge air cycling in a twin tower air dyer.

BRIEF SUMMARY OF THE INVENTION

The invention comprises a purge cycle control system for a twin tower air dryer in a locomotive braking system. The system includes an air dryer having first and second towers positioned between a first main reservoir and a second main reservoir of the locomotive braking system and being configured to switch the flow of air through one of the first and second towers to the other of the first and second towers in response to a purge control command. The system further includes a computer controlled braking system that is coupled to the locomotive braking system and to the air dryer by a purge control line. For example, the computer controlled braking system is coupled to a 13 pipe of the locomotive braking system, a 20 pipe of the braking system, locomotive brake cylinders and a brake pipe of the braking system. The system also includes a first pressure transducer positioned to determine the pressure on one side of a brake pipe charging orifice and a second pressure transducer positioned to determine the pressure on the opposing side of the brake pipe charging orifice. An air compressor link is also used to provide a signal to the computer controller braking system that indicates when the air compressor is operating.

The computer controlled braking system is programmed to send a purge control command to the air dryer when the total flow of air through the air dyer has exceeded a predetermined threshold. The predetermined threshold is the wet air capacity of one of the towers in the air dryer and is determined based on the particular design of the air dyer being controller by the system. The total flow of air is determined by calculating and summing the amount of air used for a bail, the amount of air used for an independent brake, the amount of air used for charging the brake pipe, the amount of air used for charging a second main reservoir. The total amount of air used may then be compared against the wet air capacity of the air dryer tower to determine whether it is appropriate to perform a purge cycle.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
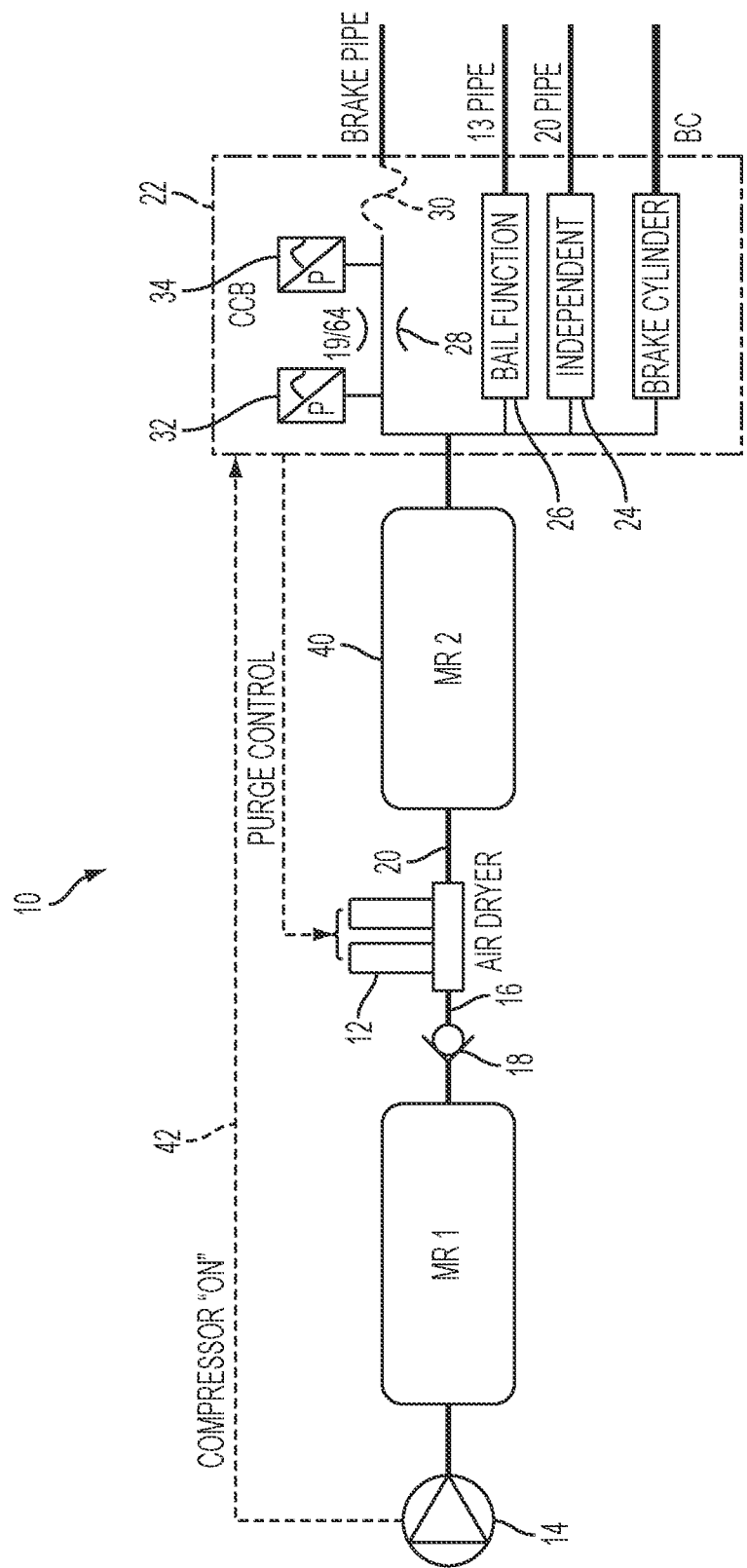
FIG. 1 is a schematic of an air dryer purge control system according to the present invention.

Referring now to the drawings, wherein like reference numerals refer to like parts throughout, there is seen in FIG. 1 a purge cycle control system 10 for a twin tower dessicant air dryer 12. Air dryer 12 is typically positioned downstream of the locomotive air compressor 14 and first main reservoir MR1. The inlet 16 of air dryer 12 is connected to the first main reservoir MR1 via a back flow valve 18 and the outlet 20 of air dryer 12 is connected to the second main reservoir MR2. A computer controlled brake (CCB) system 22 is connected to the outlet of the second main reservoir and comprises a microcomputer-based system that provides full automatic and independent brake control for locomotives. CCB systems 22 are known in the art, such as the CCB II and CCB 26 available from New York Air Brake, LLC of Watertown, N.Y.

CCB system 22 includes a 20 pipe circuit 24 interconnected to the 20 pipe, also referred to as the independent application and release pipe, and a 13 pipe circuit 26 interconnected to the 13 pipe, also referred to as the actuating pipe. In a locomotive consist (i.e., two or more locomotives connected together) having CCB system 22, pressure developed in 20 pipe circuit 24 provides brake cylinder pressure to the locomotive brake cylinders and thus applies the independent locomotive brakes. Pressure developed in 13 pipe circuit 26 actuates a control valve to provide bail-off command pressure. Control system 10 further includes a 19/64" charging orifice 28 located between a second main reservoir MR2 of the locomotive braking system and a brake pipe relay 30 that connects the locomotive air system to the train brake pipe. Pressure transducers 32 and 34 are positioned on either side of charging orifice 28 for sampling and reporting the pressures at those locations.

As seen in FIG. 1, control system 10 further includes a purge control link 40 between CCB system 22 and air dryer 12 so that CCB system 22 can signal air dryer 12 to execute a purge cycle to switch the primary air flow and counter-flow between the two towers of air dryer 12. In addition, CCB system 22 is connected to air compressor 14 by a link 42 so that CCB system 22 can receive a signal indicating that air compressor 14 is on, thus providing CCB system 22 with an indication that the air supply system is in a charging state. This information is particularly useful during a dry charge of the locomotive when first main reservoir MR1 and second main reservoir MR2 are being charged from an exhausted state because the flow rates are very high during a dry charge so the purge cycle needs to occur more frequently to keep up with the saturation of the desiccant. As explained below, when the compressor is on and the second main reservoir pressure is low (such as below the pressure governor setting, which is typically 120 psi) and increasing, the purge cycle can be adapted to occur more frequently to handle the large volume of air moving through air dryer 12.

Figure 2:
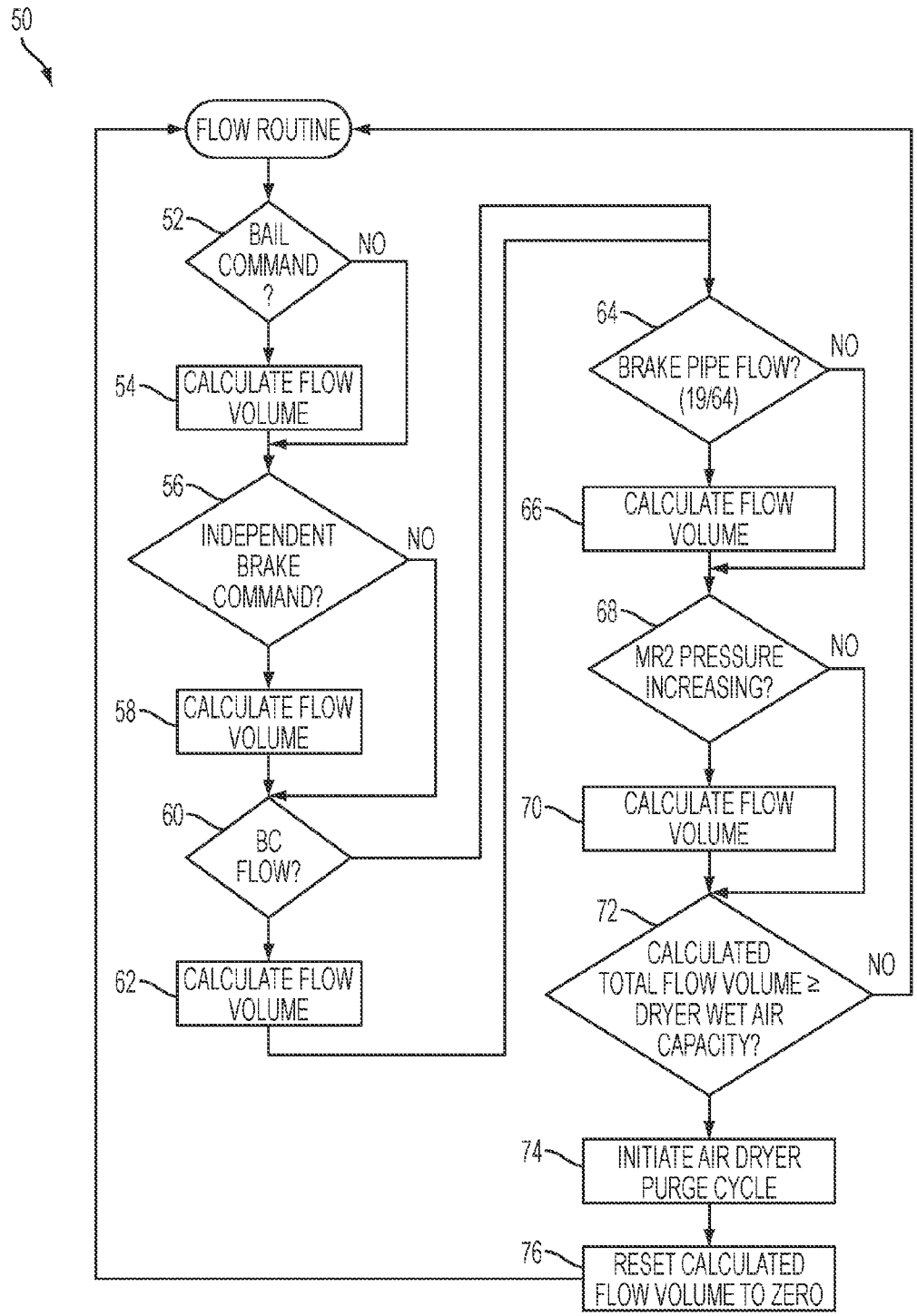
FIG. 2 is a flow chart of a method of controlling an air dryer according to the present invention.

Referring to FIG. 2, CCB 22 is programmed to implement a purge cycle process 50 to determine the optimal time for initiating a purge cycle in air dryer 12 after a continuing recalculation of flow volume determines that the wet air capacity of a particular air dryer 12 has been reached. The first step in process 50 is to perform a check 52 whether there is a bail command. If so, the flow volume is calculated 54. Flow volume is calculated in step 54 based on the amount of air consumed for a bail, which can be approximated based on the volume of the 13 pipe, the average number of locomotives in a consist (for example, five), and the charge pressure in the 13 pipe, typically MR2 pressure. For example, the following formula may be used:

$$\text{Air Vol}_{13}\ \text{ft}^3 = (\text{No. Locos})*(\text{Locomotive Length ft})* \\ (\text{Vol 13 Pipe ft}^3/\text{ft})*(\text{Pressure}_{13}\ \text{psi}/\text{Pressure}_{atm}\ \text{psi}).$$

Thus, five locomotives, where each locomotive is 75 ft long and has a 3/4" ID pipe and a 13 pipe charge pressure of 145 psi, would require approximately 11.3 ft³ of air as the formula above would result in Air Vol$_{13}$ ft³=(5)(75) ((0.75²*π/4)/144)(145/14.7)=11.3 ft³.

After flow calculation 54, of if there was no bail command at check 52, a check is performed 56 to determine whether CCB system 22 has received an independent brake command. If so, flow volume is calculated 58. The calculated flow volume in step 58 is based on the amount of air consumed in an independent brake application, which can be approximated based on the volume of the 20 pipe, the average number of locomotives in a consist (for example, five), and the charge pressure in the 20 pipe, which is known by CCB system 22 on the lead locomotive and can be either measured by CCB system 22 at the trailing locomotive or assumed to be the typical maximum independent pressure, 45 psi. For example, the following formula may be used:

$$\text{Air Vol}_{20}\ \text{ft}^3 = (\text{No. Locos})*(\text{Locomotive Length ft})* \\ (\text{Vol 20 Pipe ft}^3/\text{ft})*(\text{Pressure}_{20}\ \text{psi}/\text{Pressure}_{atm}\ \text{psi}).$$

Thus, five locomotives, where each locomotive is 75 ft long and has a 3/4" ID pipe with a 20 pipe charge pressure of 40 psi, would require approximately 3.1 ft³ of air.

After flow calculation 58, or if there was no independent brake command at check 56, a check is performed 60 whether there is brake cylinder (BC) flow. Air is supplied to the brake cylinders on the locomotive in response to either an independent brake application or an automatic brake application. If both an independent and automatic brake application are made, the brake cylinder pressure is determined to be the greater of the two inputs. The logic of brake cylinder pressure development is well known to those skilled in the art. For each brake application, regardless of independent or automatic, the calculated flow volume in step 62 is a function of the brake cylinder pressure and the total brake cylinder volume on that locomotive as follows:

$$\text{Air Vol}_{BC}\ \text{ft}^3 = (\text{Brake Cylinder Volume}_{locomotive}\ \text{ft}^3)* \\ (\text{Pressure}_{BC}\ \text{psi}/\text{Pressure}_{atm}\ \text{psi}).$$

Thus, 5.1 ft³ of air is needed to pressurize the locomotive brake cylinders to 40 psi if the locomotive has a total BC volume of 1.86 ft³.

After flow calculation 62, or if there was no brake cylinder flow at check 60, a check is performed 64 whether there is brake pipe flow. Brake pipe flow occurs when the brake pipe relay maintains the brake pipe pressure against leakage, and during a brake release and recharge. Check 64 may thus be performed by comparing the outputs of pressure transducers 32 and 34 to determine whether there is flow through the 19/64 orifice. If check 64 determines that there is brake pipe flow, the flow volume is calculated 66. Flow volume in step 66 is calculated based on the brake command state and by the pressure differential across 19/64" charging orifice 28, which is positioned between second main reservoir MR2 and brake pipe relay 30. Air flow is a function of the pressure drop across an orifice, the size of the orifice, and the upstream pressure. Thus, the outputs of pressure transducers 32 and 34 as well as the known size of 9/64" charging orifice 28 allows for an estimation of the brake pipe flow. The formula for air flow through an orifice is well known and generally of the form:

$$Q = C_f A_o * \text{SqRt}(2\Delta P/\rho)$$

where Q is flow rate, $A_o$ is the orifice area, $C_f$ is the flow coefficient, $\Delta P$ is the pressure across the orifice, and p is the air density. The total flow volume through the 19/64 orifice over a period of time can thus be calculated as:

$$\text{Air Vol}_{19/64}\ \text{ft}^3 = (Q\ \text{ft}^3/\text{min})*(\text{Time min}).$$

For example, if the measured flow rate is 15 SCFM over a period of 5 minutes, then the total air volume can be calculated to be 75 ft³.

After flow calculation 66, of if there was no brake pipe flow at check 64, a check is performed 68 whether second main reservoir MR2 pressure is increasing. Check 68 may be performed by checking air compressor link 42 to determine if compressor 14 is operating, i.e., in the "on" state, and then using the output of pressure transducer 32, which is in communication with and downstream of second main reservoir MR2, to determine any pressure increase in second main reservoir MR2 over time. If second main reservoir MRS pressure is increasing, flow volume is calculated 70. For example, the following formula may be used:

$$\text{Air Vol}_{MR2\ Charge}\ \text{ft}^3 = V_{MR2} * (P_{MR2\ increase}/P_{atm}).$$

For example, it would take 19.7 ft³ of air to increase the pressure in MR2 from 125 psi to 145 psi, where MR2 is 14.5 ft³.

After flow calculation 70, of if there was no second main reservoir MR2 pressure increasing at check 68, a final check is performed 72 whether the calculated flow sum from all sources, i.e., the calculated total flow volume, is greater than or equal to the wet air capacity of air dryer 12. The wet air capacity is defined as the average volume of wet air which will saturate a desiccant tower in air dryer 12, which is a function of the amount of desiccant in the desiccant column, the chemistry of the desiccant, and related physical characteristics of the particular design of air dryer 12. Based on these factors, a total wet air capacity can be calculated for the particular air dryer 12 and used for check 72. For example, railway air dryers are typically rated at inlet conditions of 100% RH, 100° F., and 100 SCFM. At these inlet conditions, the desiccant beds are typically designed to be saturated in approximately 2 minutes. For an air dryer with these design characteristics, the desiccant bed will be saturated after approximately 200 ft³ has flowed through it. The purge control logic of the present invention may be programmed to switch desiccant beds when the total air, as notionally calculated by purge cycle process 50, exceeds 200 ft³. The wet air capacity of air dryer 12 is preferably a user configurable setting that can be changed to accommodate the particular design of air dryer 12 that is in use. Alternatively, system 10 can be pre-programmed with a list of available air dyers or standard components, and their corresponding wet air capacities, and a user can select the appropriate air dryer or components being used in a particular system 10.

If check 72 determines that the wet air capacity has been reached, the air dryer purge cycle is initiated 74, such as by sending a purge cycle control signal from CCB system 22 to air dryer 12 via link 40. The calculated flow volume is then reset to zero 76 and processing returns to the beginning to measure the wet air capacity of the newly active tower in air dryer 12. If check 72 does not determine that the calculated flow is greater than or equal to the wet air capacity of air dryer 12, processing returns to the beginning and is repeated with any new flow calculations added to the results of prior flow calculations, thus accumulating the amount of wet air being processed by air dryer 12, until check 72 determines that enough wet air has passed through air dryer 12 such that it is time to initiate a purge cycle.

Using process 50, control system 10 can thus determine when there is flow through air dryer 12 and the approximate total volume of air that has flowed through air dryer 12 during a given measurement interval. When the volume of air calculated to have flowed through air dryer 12 approximates the wet air capacity of a tower in air dryer 12, CCB system 22 can command the initiation of a purge cycle based on actual conditions rather than an arbitrary time period. As a result, air dryer system 10 provides very high purge air efficiency because the purging occurs on the basis of the air volume that has actually been processed by air dryer 12 rather than a fixed time interval that may bear no relationship to the actual usage of air dryer 12.

What is claimed is:

1. A method of controlling the purge cycle in a twin tower air dryer in a locomotive braking system having a plurality of brake cylinders, comprising the steps of:
    calculating the amount of air used for a bail;
    calculating the amount of air used for an independent brake;
    calculating the amount of air used by the locomotive brake cylinders;
    calculating the amount of air used for charging a brake pipe;
    calculating the amount of air used for charging a second main reservoir;
    checking whether the total calculated amount of air used exceeds a predetermined threshold; and
    causing the air dryer to perform a purge cycle if the total calculated amount of air exceeds the predetermined threshold.

2. The method of claim 1, wherein the step of calculating the amount of air used for a bail comprises calculating a total volume of a 13 pipe of the locomotive braking system times a normalized pressure of the 13 pipe.

3. The method of claim 1, wherein the step of calculating the amount of air used for an independent brake comprises calculating a total volume of a 20 pipe of the locomotive braking system times a normalized pressure of the 20 pipe.

4. The method of claim 1, wherein the step of calculating the amount of air used for the locomotive brake cylinder comprises calculating a total volume of the locomotive brake cylinders times a normalized pressure of the locomotive brake cylinders.

5. The method of claim 1, wherein the step of calculating the amount of air used for charging the brake pipe comprises measuring an air flow rate across a brake pipe charging orifice and integrating over time to determine the air volume.

6. The method of claim 1, wherein the step of calculating the amount of air used for charging the second main reservoir comprises determining whether any pressure in the second main reservoir is increasing and, if so, calculating the amount of air that has flowed through the air dryer by multiplying the pressure increase in the second main reservoir by a volume of the second main reservoir.

* * * * *